United States Patent
Janowski et al.

(10) Patent No.: US 10,752,721 B2
(45) Date of Patent: Aug. 25, 2020

(54) ELASTOMERIC COPOLYMERS BASED ON [BIS(TRIHYDROCARBYLSILYL) AMINOSILYL]-FUNCTIONALIZED STYRENE AND THEIR USE IN THE PREPARATION OF RUBBERS

(71) Applicant: Synthos Dwory 7 spolka z ograniczona odpowiedzialnoscia spolka jawna, Oswiecim (PL)

(72) Inventors: Bartlomiej Janowski, Debica (PL); Radoslaw Kozak, Chorzow (PL); Barbara Robak, Gliwice (PL); Jaroslaw Rogoza, Kryspinow (PL); Malgorzata Walenia, Szczecin (PL); Pawel Weda, Knurow (PL)

(73) Assignee: SYNTHOS DWORY 7 SPOLKA Z ORGANICZONA ODPOWIEDZIALNOSCIA SPOLKA JAWNA, Oswiecim (PL)

( * ) Notice: Subject to any disclaimer, the term of this patent is extended or adjusted under 35 U.S.C. 154(b) by 0 days.

(21) Appl. No.: 16/078,683

(22) PCT Filed: Oct. 4, 2017

(86) PCT No.: PCT/EP2017/075262
§ 371 (c)(1),
(2) Date: Aug. 22, 2018

(87) PCT Pub. No.: WO2018/065494
PCT Pub. Date: Apr. 12, 2018

(65) Prior Publication Data
US 2019/0062483 A1    Feb. 28, 2019

(30) Foreign Application Priority Data
Oct. 6, 2016  (EP) .................... 16461560

(51) Int. Cl.
| | | |
|---|---|---|
| C08F 236/10 | (2006.01) |
| B60C 1/00 | (2006.01) |
| C08F 212/14 | (2006.01) |
| C08F 297/04 | (2006.01) |
| C08L 9/06 | (2006.01) |
| C08F 12/26 | (2006.01) |
| C08K 3/04 | (2006.01) |
| C08K 3/16 | (2006.01) |
| C08K 3/36 | (2006.01) |
| C08K 5/00 | (2006.01) |
| C08L 9/02 | (2006.01) |

(52) U.S. Cl.
CPC .......... *C08F 236/10* (2013.01); *B60C 1/0016* (2013.01); *C08F 12/26* (2013.01); *C08F 212/14* (2013.01); *C08F 297/044* (2013.01); *C08K 3/04* (2013.01); *C08K 3/16* (2013.01); *C08K 3/36* (2013.01); *C08K 5/0025* (2013.01); *C08L 9/02* (2013.01); *C08L 9/06* (2013.01); *C08F 2500/21* (2013.01); *C08F 2800/20* (2013.01)

(58) Field of Classification Search
None
See application file for complete search history.

(56) References Cited

U.S. PATENT DOCUMENTS

| | | |
|---|---|---|
| 3,109,871 A | 11/1963 | Zelinski et al. |
| 3,253,008 A | 5/1966 | Fink |
| 4,196,154 A | 4/1980 | Tung et al. |
| 4,835,216 A | 5/1989 | Morikawa et al. |
| 4,861,742 A | 8/1989 | Bronstert et al. |
| 4,894,409 A | 1/1990 | Shimada et al. |
| 4,935,471 A | 6/1990 | Halasa et al. |
| 5,550,203 A | 8/1996 | Engel et al. |
| 6,515,087 B2 | 2/2003 | Hsu et al. |
| 6,627,721 B1 | 9/2003 | Rodewald et al. |
| 6,627,722 B2 | 9/2003 | Rodewald et al. |
| 6,630,552 B1 | 10/2003 | Rodewald et al. |
| 6,670,471 B1 | 12/2003 | Rodewald et al. |
| 8,431,644 B2 | 4/2013 | Uesaka |
| 9,315,600 B2 | 4/2016 | Hayata et al. |
| 9,587,060 B2 | 3/2017 | Halasa et al. |
| 10,259,830 B2 | 4/2019 | Maciejewski et al. |
| 2003/0134997 A1 | 7/2003 | Rodewald et al. |
| 2004/0044157 A1 | 3/2004 | Halasa et al. |
| 2004/0044202 A1 | 3/2004 | Halasa et al. |
| 2004/0063884 A1 | 4/2004 | Halasa et al. |
| 2004/0122194 A1 | 6/2004 | Halasa et al. |

(Continued)

FOREIGN PATENT DOCUMENTS

| | | |
|---|---|---|
| EP | 0 316 255 | 5/1989 |
| EP | 0 590 491 | 4/1994 |

(Continued)

OTHER PUBLICATIONS

Office Action issued in KR Appln. No. 10-2017-7032696 dated Sep. 25, 2019 (w/ translation).
Office Action issued in KR Appln. No. 10-2018-7023211 dated Sep. 23, 2019 (w/ translation).
Office Action issued in U.S. Appl. No. 15/565,346 dated May 22, 2019.
Office Action issued in U.S. Appl. No. 15/565,360 dated Jun. 19, 2019.
Abstract of Rasul et al., "Hydrosilylation reactions of tetramethyldisilazanes and their derivatives" *Journal of Organometallic Chemistry*, vol. 655, iss. 1-2: 115-119 (Aug. 2002).

(Continued)

*Primary Examiner* — Robert S Loewe
(74) *Attorney, Agent, or Firm* — Nixon & Vanderhye P.C.

(57) ABSTRACT

The present invention relates to the use of specific styrene derivatives in the production of an elastomeric copolymer. The invention further relates to methods for producing an elastomeric copolymer and an elastomeric copolymer. Moreover, the invention relates to a method for preparing a rubber comprising vulcanizing the elastomeric copolymer, and a rubber as obtainable according to the method. Further, the invention relates to a rubber composition, a tire component comprising the rubber composition, and a tire comprising the tire component.

46 Claims, No Drawings

(56) References Cited

U.S. PATENT DOCUMENTS

| | | |
|---|---|---|
| 2004/0122224 A1 | 6/2004 | Halasa et al. |
| 2005/0131181 A1 | 6/2005 | Halasa et al. |
| 2007/0123631 A1 | 5/2007 | Halasa et al. |
| 2009/0023861 A1 | 1/2009 | Shimakage et al. |
| 2010/0116404 A1 | 5/2010 | Lechtenboehmer et al. |
| 2010/0152364 A1 | 6/2010 | Wong et al. |
| 2010/0190885 A1 | 7/2010 | Hua et al. |
| 2011/0275756 A1 | 11/2011 | Ito et al. |
| 2012/0041134 A1 | 2/2012 | Ito et al. |
| 2014/0275430 A1 | 9/2014 | Ishino et al. |
| 2018/0065996 A1 | 3/2018 | Maciejewski et al. |
| 2018/0072101 A1 | 3/2018 | Janowski et al. |
| 2018/0072821 A1 | 3/2018 | Janowski et al. |

FOREIGN PATENT DOCUMENTS

| | | |
|---|---|---|
| EP | 1 792 892 | 6/2007 |
| EP | 2 182 028 | 5/2010 |
| EP | 2 196 326 | 6/2010 |
| EP | 2 277 940 | 1/2011 |
| EP | 2 749 575 | 7/2014 |
| EP | 2 772 515 | 9/2014 |
| JP | 7-82422 | 3/1995 |
| JP | 9-227636 | 9/1997 |
| JP | 2000-086727 | 3/2000 |
| JP | 2004-59781 | 2/2004 |
| JP | 2005-232261 | 9/2005 |
| JP | 2010-116556 | 5/2010 |
| JP | 2011-79913 | 4/2011 |
| JP | 2012-197406 | 10/2012 |
| JP | 2013-155253 | 8/2013 |
| JP | 2013-249418 | 12/2013 |
| JP | 2014-001308 | 1/2014 |
| JP | 2014-105241 | 6/2014 |
| JP | 2018-513907 | 5/2018 |
| JP | 2019-521951 | 8/2019 |
| WO | WO 2011/076377 | 6/2011 |
| WO | WO 2013/077021 | 5/2013 |
| WO | WO 2016/008507 | 1/2016 |
| WO | WO 2016/162473 | 10/2016 |
| WO | WO 2016/162482 | 10/2016 |
| WO | WO 2016/162528 | 10/2016 |
| WO | WO 2018/065486 | 4/2018 |

OTHER PUBLICATIONS

Abstract of Rietz et al., "Reaktionen von Bis(trimethylsilyl)amino-substituierten Chlorsilanen [(Me3Si)2N]Me2—nPhnSiCl (n=0, 1, 2) mit Lithium—Darstellung von Bis(trimethylsilyl)amino-substituierten Silyllithiumverbindungen und Disilanen" *Journal of Organometallic Chemistry*, vol. 556, Issues 1-2, Apr. 15, 1998, pp. 67-74.

Lee, S. et al., "Palladium-catalyzed synthesis of arylamines from aryl halides and lithium bis(trimethylsilyl) amide as an ammonia equivalent", Org. Lett., 2001 3(17), pp. 2729-2732.

Zapilko, C. et al., "Advanced Surface Functionalization of periodic mesoporous Silica: Kinetic Control by Trisilazane reagents", J. Am. Chem. Soc., 2006, 128(50), pp. 16266-16276.

International Preliminary Report on Patentability issued in PCT/EP2016/057735 dated Oct. 10, 2017.

International Preliminary Report on Patentability issued in PCT/EP2016/057757 dated Oct. 10, 2017.

International Preliminary Report on Patentability issued in PCT/EP2016/057834 dated Oct. 10, 2017.

International Search Report for PCT/EP2016/057735 dated Jun. 17, 2016, 4 pages.

International Search Report for PCT/EP2016/057757, dated Jun. 16, 2016, 2 pages.

International Search Report for PCT/EP2016/057834, dated Jun. 16, 2016, 4 pages.

International Search Report issued in PCT/EP2017/075251 dated Jan. 18, 2018.

International Search Report issued in PCT/EP2017/075262 dated Jan. 18, 2018.

Written Opinion of the International Searching Authority issued in PCT/EP2017/075251 dated Jan. 18, 2018.

Written Opinion of the International Searching Authority issued in PCT/EP2017/075262 dated Jan. 18, 2018.

Office Action issued in JP Appln. No. 2017-552919 dated Nov. 19, 2019 (w/ translation).

Office Action issued in JP Appln. No. 2018-539809 dated Dec. 17, 2019 w/ translation.

Office Action issued in JP Appln. No. 2017-552924 dated Dec. 24, 2019 (w/ translation).

Office Action issued in IN Appln. No. 201817028505 dated Dec. 26, 2019.

Office Action issued in IN Appln. No. 201717039943 dated Jan. 13, 2020.

Office Action issued in IN Appln. No. 201817028574 dated Feb. 20, 2020.

ELASTOMERIC COPOLYMERS BASED ON [BIS(TRIHYDROCARBYLSILYL) AMINOSILYL]-FUNCTIONALIZED STYRENE AND THEIR USE IN THE PREPARATION OF RUBBERS

This application is the U.S. national phase of International Application No. PCT/EP2017/075262 filed 4 Oct. 2017, which designated the U.S. and claims priority to EP Patent Application No. 16461560.1 filed 6 Oct. 2016, the entire contents of each of which are hereby incorporated by reference.

The present invention relates to the use of specific styrene derivatives in the production of an elastomeric copolymer. The invention further relates to methods for producing an elastomeric copolymer and an elastomeric copolymer. Moreover, the invention relates to a method for preparing a rubber comprising vulcanizing the elastomeric copolymer, and a rubber as obtainable according to the method. Further, the invention relates to a rubber composition, a tire component comprising the rubber composition, and a tire comprising the tire component.

BACKGROUND OF THE INVENTION

It is important for elastomeric copolymers that are used in tires, hoses, power transmission belts and other industrial products to have a good compatibility with fillers, such as carbon black and silica. To attain improved interaction with fillers, such elastomeric copolymers can be functionalized with various compounds, such as amines. It has also been recognized that carbon black, when employed as reinforcing filler in rubber compounds, should be well dispersed throughout the rubber in order to improve various physical properties.

EP 0 316 255 A1 discloses a process for end-capping polydienes by reacting a metal terminated polydiene with a capping agent such as a halogenated nitrile, a heterocyclic aromatic nitrogen-containing compound or an alkyl benzoate. Additionally, EP 0 316 255 A1 discloses that both ends of the polydiene chains can be capped with polar groups by utilizing functionalized initiators, such as lithium amides.

U.S. Pat. No. 4,894,409 teaches a rubber composition comprising not less than 20% by weight of an amino group-containing diene based polymer in a rubber component, and 10 to 100 parts by weight of silica as a filler with respect to 100 parts by weight of the rubber component.

U.S. Pat. No. 4,935,471 A discloses methods of synthesizing living anionic polymerization initiators based on aromatic N-heterocyclic compounds such as pyrrole, imidazole, pyrazole, pyrazinyl, pyrimidine, pyridazinyl and phenanthroline derivatives and their use in the production of N-functionalized polybutadienes. A similar approach is disclosed in U.S. Pat. No. 6,515,087 B2, EP 0 590 491 A1 and WO 2011/076377 where acyclic and cyclic amines are used in the preparation of the active anionic polymerization initiators and are utilized in a further step in the synthesis of di-N-functionalized butadiene-styrene copolymers.

The synthesis of di-N-functionalized butadiene-styrene polymers is also disclosed in U.S. Pat. No. 4,196,154 A, U.S. Pat. No. 4,861,742 A and U.S. Pat. No. 3,109,871 A. However, in the processes for their preparation, aminofunctional aryl-methyl ketones are used and also serve as functionalizing terminating agents. The above described N-modification methods only allow the preparation of polydienes in which the polymer chain may contain no more than two moieties with amine functionality.

Another approach to prepare N-functionalized polymers with a different content of N-functional groups would be the incorporation of suitable styrene monomers into the polymer chain, which controlled addition into the reaction system would lead to a wide variety of styrene-butadiene rubbers with a different content of N-functional groups and thus exhibiting different ability to disperse inorganic fillers. EP 1 792 892 A2 discloses a method for the preparation of N-functionalized styrene monomers (by the reaction of a variety of acyclic and cyclic lithium amides with 1,3- or 1,4-divinylobenzene, 1,3-di(iso-propylene)benzene or a mixture of isomeric chloro-methylvinylbenzenes) that are used in a further step in the preparation of butadiene-styrene copolymer rubbers containing different amounts of amino-functional groups.

According to U.S. Pat. No. 6,627,722 B2, polymer-containing units of a vinylaromatic ring-substituted with one or two alkyleneimine-alkyl groups, especially pyrrolidinyl-methyl or hexamethylene-iminomethyl groups, can be polymerized into elastomeric copolymers having low hysteresis and good compatibility with fillers, such as carbon black and silica. Improved polymer properties are achieved because the styrene derivatives improve the compatibility of the rubber with the fillers.

EP 2 772 515 A1 teaches a conjugated diene polymer obtained by polymerizing a monomer component including a conjugated diene component and a silicon-containing vinyl compound. The silicon-containing vinyl compound may be a silyl-substitued styrene. However, the compounds according to EP 2 772 515 A1 are hydrolytically unstable under the typical processing conditions, compare the N,N-bis(SiMe$_3$)$_2$ aniline derivatives disclosed in Org. Lett. 2001, 3, 2729.

Therefore, it was the object of the present invention to overcome the disadvantages associated with the prior art and to provide functionalized styrene derivatives whose application in the synthesis of polydienes leads to end-chain and/or in-chain modified polymer compositions that have better affinity to both of the two typical fillers commonly applied in tire production, i.e. silica and carbon black. The functionalized styrene derivatives should also be hydrolytically more stable than those of EP 2 772 515 A1.

This object was achieved by the use of [bis(trihydrocarbyl-silyl)aminosilyl]-functionalized styrene derivatives of formula (I). These styrene derivatives are preferably used as co-monomers in the production of elastomeric copolymers. Alternatively, or additionally, they are preferably used in the preparation of polymerization initiators.

SUMMARY OF THE INVENTION

Accordingly, the present invention relates to styrene derivatives that can be polymerized into elastomeric copolymers having good compatibility with fillers, such as silica and/or carbon black. The styrene derivatives of the present invention are typically incorporated into the elastomeric copolymer by being copolymerized with one or more conjugated diolefin monomers and optionally (and preferably) other monomers that are copolymerizable therewith, such as vinyl aromatic monomers. In any case, improved copolymer properties are achieved because the styrene derivatives of the present invention improve the compatibility of the resultant rubber with the types of fillers that are typically used in rubber compounds, such as silica and/or carbon black.

The present invention more specifically relates to monomers that are particularly useful for the copolymerization with conjugated diolefin monomers and optionally vinyl aromatic monomers, to produce elastomeric copolymers having better compatibility with fillers.

The monomer of the present invention is a styrene derivative of structural formula (I)

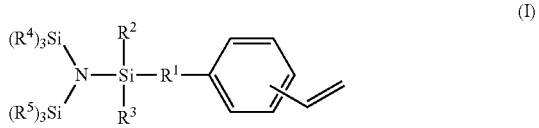

wherein $R^1$ is selected from the group consisting of:
a) a single bond;
b) —$(CH_2)_n$—, wherein n represents an integer from 1 to 12;
c) —$(CH_2CH_2Y)_n$—, wherein n represents an integer from 1 to 12, and Y can independently be oxygen or sulfur;
d) —$CH_2$—$(CH_2CH_2Y)_n$—$CH_2$—, wherein n represents an integer from 1 to 12, and Y can independently be oxygen or sulfur;
e) —$(CH_2CH_2NR)_n$—, wherein n represents an integer from 1 to 12, and R can independently represent an alkyl group containing from 1 to 10 carbon atoms, or an aryl or aralkyl group containing from 6 to 10 carbon atoms;
f) —$CH_2$—$(CH_2CH_2NR)_n$—$CH_2$—, wherein n represents an integer from 1 to 12, and R can independently represent an alkyl group containing from 1 to 10 carbon atoms, or an aryl or aralkyl group containing from 6 to 10 carbon atoms;

$R^2$, $R^3$ can be the same or different and represent an alkyl group containing from 1 to 10 carbon atoms, or an aryl or aralkyl group containing from 6 to 10 carbon atoms; and $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms.

The compound of formula (I) is a monomeric styrene derivative. Employing these functionalized styrene derivatives (containing the moiety $\{(R^5)_3Si\}\{(R^4)_3Si\}NSiR^3R^2$—$(R^1)$— in their structure) in the synthesis of SBR polymers not only increases the affinity of the modified polymers to the commonly used fillers via non-covalent interactions, but also provides for covalent interactions between the modified polymer and filler, in particular silica, due to the reactivity of the $\{(R^5)_3Si\}\{(R^4)_3Si\}NSiR^3R^2$—$(R^1)$— moiety.

Surprisingly, it was found that the preparation of rubber compounds based on styrene-butadiene rubbers modified with a small amount of styrene derivative of formula (I) leads to copolymers that give rubber compositions having by 32% better wet grip and by 27% better rolling resistance as compared to those prepared on the basis of non-functionalized styrene. Thus, the styrene derivatives according to the present invention are preferably used as comonomers in the production of elastomeric copolymers. Alternatively, or additionally, they are preferably used in the preparation of polymerization initiators.

Further, it was found that the bis(trimethylsilyl)amino- or bis(trimethylsilyl)aminoalkyl-substituted styrene derivatives disclosed in EP 2 772 515 A1 have a serious drawback, insofar as they are hydrolytically unstable, due to the high reactivity of the $(Me_3Si)_2N$—R— group with water, particularly under acidic or basic conditions (compare Org. Lett. 2001, 3, 2729). Thus, the hydrolysis of molecular or macromolecular compounds containing e.g. the moiety $(Me_3Si)_2N$—R— leads to the formation of $Me_3OSiMe_3$, with simultaneous restoration of free $H_2N$—R— groups which in the final rubber composition can interact with the carbon black only by non-covalent bonds and with the silica by hydrogen bonding.

In contrast to those styrene derivatives containing a bis(trialkylsilyl)amine moiety $((R_3Si)_2N$—R—), see e.g. EP 2 772 515 A1, the compounds employed according to the present invention have a nitrogen atom that is surrounded by three silyl groups, $\{(R^5)_3Si\}\{(R^4)_3Si\}NSiR^3R^2$—$(R^1)$—. The styrene derivatives of the invention are surprisingly hydrolytically more stable (compare Organometallic Chemistry 2002, 655, 115, teaching $(RMe_2Si)_2NSiMe_3$ derivatives which were isolated by extraction of the organic layer with an aqueous solution of $NH_4Cl$).

Moreover, when the styrene derivative is incorporated into the elastomeric copolymer, as initiator and/or as comonomer, incorporation of additional functionalized comonomer, and/or omega functionalization, can be reduced, or can even completely be dispensed with.

Further, and in contrast to $[(R_3Si)_2N$—R—]-functionalized polymers, any partial hydrolysis of groups of the type $\{(R^5)_3Si\}\{(R^4)_3Si\}NSiR^3R^2$—$(R^1)$— in a copolymer as functionalized according to the present invention will at elevated temperature lead to the formation of reactive silanol groups ($HOSiR^3R^2$—$(R^1)$—). These groups are capable of forming a stable covalent bond with the silica filler through a $[(SiO_2)O_3Si]$—O—$SiR^3R^2$—$(R^1)$— bond sequence, by the cross-condensation reaction between hydroxyl groups on the silica's surface, $[(SiO_2)O_3Si]$—OH, with $HOSiR^3R^2$—$(R^1)$-functionalized polymer, compare J. Am. Chem. Soc. 2006, 128, 16266 for molecular trisilylamine derivatives of the type $(RMe_2Si)_2NSiMe_2R'$, used in the modification of the surface of MCM-41. Moreover, the remaining $\{(R^5)_3Si\}\{(R^4)_3Si\}NSiR^3R^2$—$(R^1)$— moieties are capable of interacting with carbon filler (e.g. carbon black) via noncovalent interaction.

According to a first aspect, the invention relates to the use of the styrene derivative of structural formula (I) as defined above, in the production of an elastomeric copolymer. The use according to the first aspect is preferably i) as comonomer, or ii) as alkali metal salt derivative, as initiator for the copolymerization, or iii) both as comonomer and as alkali metal salt derivative, as initiator for the copolymerization.

According to a second aspect, the invention relates to a method for producing an elastomeric copolymer.

According to a third aspect, the invention relates to an elastomeric copolymer comprising repeat units that are derived from
A) 20 wt. % to 99.95 wt. %, by weight of the copolymer, of one or more (preferably conjugated) diene monomers;
B) 0 wt. % to 60 wt. %, by weight of the copolymer, of one or more vinyl aromatic monomers; and
C) 0.05 wt. % to 50 wt. %, by weight of the copolymer, of one or more styrene derivatives of formula (I).

According to a fourth aspect, the invention relates to a method for preparing a rubber comprising vulcanizing the elastomeric copolymer according to the third aspect in the presence of one or more vulcanizing agents.

According to a fifth aspect, the invention relates to a rubber as obtainable according to the method of the fourth aspect.

According to a sixth aspect, the invention relates to a rubber composition comprising x) a rubber component comprising the rubber according to the fifth aspect.

According to a seventh aspect, the invention relates to a tire component comprising the rubber composition according to the sixth aspect.

Finally, and according to an eight aspect, the invention relates to a tire comprising the tire component according to the seventh aspect.

DETAILED DESCRIPTION OF THE INVENTION

The Styrene Derivative

The styrene derivative as used according to the present invention is of formula (I). Preferably, the two substituents on the aromatic ring are located in meta (i.e. in 1, 3) or in para (i.e. in 1, 4) position to one another, more preferably in para (1, 4) position.

In a preferred embodiment, the styrene derivative is a para or meta isomer, i.e. is of formula (Ia) or (Ib)

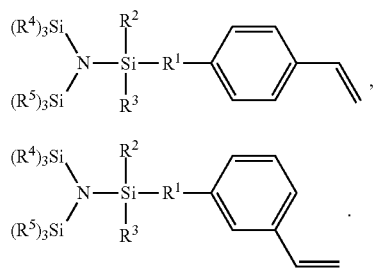

It is further preferred that the styrene derivative of Formula (I) has $R^1$ selected from the group consisting of:
a) a single bond; and
b) —$(CH_2)_n$—, wherein n represents an integer from 1 to 12.

More preferably, $R^1$ is b) —$(CH_2)_n$—, wherein n represents an integer from 1 to 5, preferably n represents an integer from 1 to 3, in particular wherein n is 1, i.e. $R^1$ is —$(CH_2)$—. However, it is a most preferred embodiment in all aspects of the invention that $R^1$ is a) a single bond and b) —$(CH_2)$— group.

Exemplary styrene derivatives according to the first aspect are selected from any one of formulae (1), (2), (3), (4), (5), and (6)

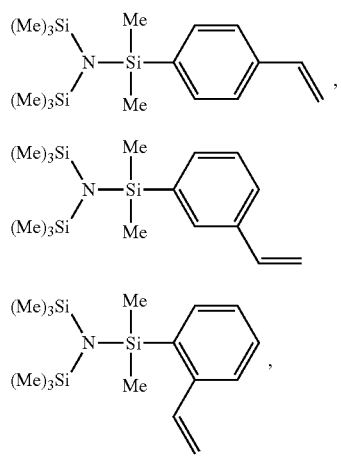

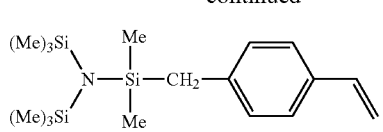

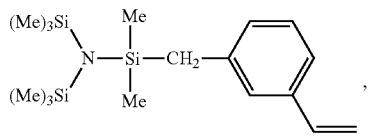

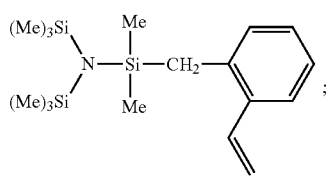

more preferably the styrene derivative of formula (I) is selected from any one of formulae (1), (2), (4), and (5);

most preferably the styrene derivative of formula (I) is selected from any one of formulae (1), (4), and (5).

The styrene derivative of formula (I) may be prepared by e.g. reaction of a halogenosilane $\{(R^5)_3Si\}$ $\{(R^4)_3Si\}NSiR^3R^2$—$X^1$, wherein $X^1$ is selected from chlorine, bromine, and iodine atoms, and $R^2$, $R^3$, $R^4$ and $R^5$ are as defined above, with a magnesium compound $X^2$—Mg—$R^1$—$C_6H_4$—CH=$CH_2$, wherein $X^2$ is selected from chlorine, bromine, and iodine atoms, and $R^1$ is as defined above. With regard to the preparation of the halogenosilane $\{(R^5)_3Si\}\{(R^4)_3Si\}NSiR^3R^2$—$X^1$, reference is made for example to J. Organomet. Chem. 556 (1998) 67-74, and U.S. Pat. No. 3,253,008.

Further details of the styrene derivatives of the invention and methods for their preparation are disclosed in the application entitled "[Bis(trihydrocarbylsilyflaminosilyl]-functionalized styrene and a method for its preparation", attorney reference P103157, PCT application no. PCT/EP2017/075251, filed on even date herewith, the disclosure of which application is incorporated herein in its entirety. Said application entitled "[Bis(trihydrocarbylsilyflaminosilyl]-functionalized styrene and a method for its preparation" claims priority from European patent application EP16461559.3 filed Oct. 6, 2016, which is also the filing date of European patent application EP16461560.1 (from which the present application claims priority).

Also, it is preferred according to the invention that $R^2$ and $R^3$ are the same or different and represent $CH_3$ or $C_6H_5$, and it is more preferred that $R^2$ and $R^3$ are the same and represent $CH_3$. It is most preferred that $R^4$ and $R^5$ all represent $CH_3$, more preferably the styrene derivative is of Formula (4) or (5) above.

Thus, the present invention in particular provides for the use of the following [bis(trimethylsilyl)amino]-functionalized styrenes:

N-(dimethyl(4-vinylbenzyl)silyl)-N,N-bis(trimethylsilyl)-amine with the formula (4), and N-(dimethyl(3-vinylbenzyl)silyl)-N,N-bis(trimethylsilyl)-amine with the formula (5).

It is further preferred according to the first aspect that the copolymer comprises, in addition to units derived from the styrene derivative of formula (I), units derived from one or more diene monomers, and optionally units derived from one or more vinyl aromatic monomers. Preferably, the diene monomer is a conjugated diene monomer.

Styrene derivatives of formula (I) may be used as comonomeric substrates for obtaining styrene-butadiene rubbers with unique physicochemical properties. Thus, the invention also relates to the use of the styrene derivative of formula (I) in the preparation of a copolymer thereof.

Preferably, the copolymer comprises repeat units that are derived from
- A) 20 wt. % to 99.95 wt. %, by weight of the copolymer, of one or more diene monomer(s);
- B) 0 wt. % to 60 wt. %, by weight of the copolymer, of one or more vinyl aromatic monomers; and
- C) 0.05 wt. % to 50 wt. %, by weight of the copolymer, of one or more styrene derivatives of formula (I) above.

Alternatively, the styrene derivative of formula (I) is used in the preparation of a polymerization initiator. In this embodiment, an alkali metal salt derivative of the styrene derivative of formula (I) is used as initiator for the copolymerization of i) one or more conjugated diene monomers and optionally ii) one or more vinyl aromatic monomers, and the alkali metal is selected from lithium, sodium, and potassium.

In a preferred embodiment, the styrene derivative of formula (I) is used as comonomer. Preferably, the styrene derivative of formula (I) is used as both x) comonomer and as y) alkali metal salt derivative of the styrene derivative of formula (I), as initiator for the copolymerization.

According to the second aspect, the invention relates to a method for producing an elastomeric copolymer comprising subjecting i) one or more diene monomers, ii) optionally one or more vinyl aromatic monomers and iii) one or more styrene derivatives of formula (I) to anionic polymerization conditions. Preferably, the diene monomer is a conjugated diene monomer.

The styrene derivative of this invention can be copolymerized into virtually any type of synthetic rubber. Preferably, the styrene derivative will be copolymerized with at least one conjugated diolefin monomer, such as 1,3-butadiene or iso-prene.

In a preferred embodiment of the second aspect, the invention relates to a process for the preparation of a copolymer component comprising coupled copolymer and terminally modified copolymer, the process comprising the following steps:
(1) providing an initiator component comprising one or more alkali metal salt derivatives of a styrene derivative of formula (I) above;
(2) contacting a monomer component comprising
  i) one or more conjugated diene monomers and
  iii) optionally one or more vinyl aromatic monomers
  with the initiator component, to initiate anionic copolymerization;
(3) continuing copolymerization, to result in a copolymer;
(4) optionally continuing copolymerization of the copolymer, in the presence of one or more functionalized monomers, to result in a functionalized copolymer;
(5) coupling a part of the copolymer of step (3) or the functionalized copolymer of step (4) with one or more coupling agents, to result in coupled copolymer; and
(6) terminally modifying a part of the copolymer of step (3) or the functionalized copolymer of step (4) with one or more terminal modifying agents, to result in terminally modified copolymer,
preferably wherein the monomer component in step (2) comprises one or more styrene derivatives of formula (I).

In a further preferred embodiment of the second aspect, the invention relates to a process for producing an elastomeric copolymer comprising subjecting i) one or more diene monomers, ii) optionally one or more vinyl aromatic monomers, and iii) one or more styrene derivatives of formula (I) above, to anionic polymerization conditions. Preferably, the anionic polymerization conditions include initiating the polymerization with an alkali metal salt derivative of the styrene derivative of formula (I).

Typically, from 0.05% to 50% (by weight of monomers) of the styrene derivative of formula (I) will be included in the polymerization. More typically, from 0.2% to 10% (by weight of monomers) of the styrene derivative of formula (I) will be included in the elastomeric copolymer. Good results can normally already be obtained by including 0.3% to 5% (by weight of monomers) of the styrene derivative of formula (I) in the elastomeric copolymer. It is typically preferred to incorporate 0.5% to 2% (by weight of monomers) of the functionalized monomer of formula (I) into the elastomeric copolymer.

At least one vinyl aromatic monomer can also be included in the polymerization. In cases where vinyl aromatic monomers, such as styrene or α-methyl styrene, are copolymerized into the rubbery copolymer, they will be included at a level of up to 60%, preferably 10% to 60% (by weight of monomers). Vinyl aromatic monomers will more typically be incorporated into the elastomeric copolymer at a level which is within the range of 10% to 50% (by weight of monomers), preferably 20% to 50% (by weight of monomers).

For instance, the elastomeric copolymer can be comprised of repeat units that are derived from 58 weight percent to 90% (by weight of monomers) of 1,3-butadiene, from 8% to 40% (by weight of monomers) of styrene, and from 0.05% to 50% (by weight of monomers) of the styrene derivative of formula (I).

According to the present invention, polymerization and recovery of polymer are suitably carried out according to various methods suitable for diene monomer polymerization processes. This includes batch-wise, semi-continuous, or continuous operations under conditions that exclude air and other atmospheric impurities, particularly oxygen and moisture. Preferably, the polymerization is batch-wise or continuous. The commercially preferred method of polymerization is anionic solution polymerization.

In batch operations, the polymerization time of functionalized monomers can be varied as desired. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours.

The temperature in the polymerization reaction is preferably in a range of from −20 to 150° C., more preferably from 0 to 120° C. The polymerization reaction can be conducted under the pressure which appears in the reaction, but is preferably conducted at a pressure which is sufficient to keep the monomer substantially in a liquid phase. That is, the polymerization pressure used differs depending upon the individual substances to be polymerized, the polymerization medium used, and the polymerization temperature employed; however, a higher pressure may be used if necessary, and such a pressure can be obtained by an appropriate means such as pressurization of reactor using a gas inert to the polymerization reaction.

The styrene derivatives of this invention can be incorporated into virtually any type of elastomeric copolymer that is capable of being made by solution polymerization with an anionic initiator. The polymerization employed in synthesizing the elastomeric copolymers will normally be carried out in a hydrocarbon solvent. The solvents used in such solution polymerizations will normally contain from 4 to 10 carbon atoms per molecule and will be liquids under the conditions of the polymerization. Some representative examples of suitable organic solvents include pentane, isooctane, cyclohexane, n-hexane, benzene, toluene, xylene, ethylbenzene, tetrahydro-furan, and the like, alone or in admixture.

In the solution polymerization, there will normally be a total of from 5 to 30 wt. % monomers in the polymerization medium.

Such polymerization media are typically comprised of the organic solvent and monomers. In most cases, it will be preferred for the polymerization medium to contain from 10 to 25 wt. % monomers. It is generally more preferred for the polymerization medium to contain 10 to 20 wt. % monomers.

Diolefin (Diene) Monomers

The elastomeric copolymers made by the process of this invention can be made by random copolymerization of the styrene derivative of the invention with (either conjugated or non-conjugated) diolefins (dienes). Conjugated diolefin monomers containing from 4 to 8 carbon atoms are generally preferred. Some representative examples of conjugated diene monomers that can be polymerized into elastomeric copolymers include 1,3-butadiene, isoprene, 1,3-pentadiene, 2,3-dimethyl-1,3-buta-diene, 2-methyl-1,3-pentadiene, 2,3-dimethyl-1,3-pentadiene, 2-phenyl-1,3-butadiene, and 4,5-diethyl-1,3-octadiene. Preferably, the conjugated diene monomer is 1,3-butadiene, isoprene, in particular 1,3-butadiene.

Preferably, the amount of A) conjugated diene monomers is 40 to 100 wt. %, by weight of the copolymer, preferably 50 to 99.8 wt. %, by weight of the copolymer, in particular 70 to 99.8 wt. %, by weight of the copolymer.

Vinyl-substituted aromatic monomers can also be copolymerized with one or more diene monomers into elastomeric copolymers, for example styrene-butadiene rubber (SBR).

Vinyl Aromatic Monomers

Some representative examples of vinyl-substituted aromatic monomers that can be utilized in the synthesis of elastomeric copolymers include styrene, 1-vinylnaphthalene, 3-methyl-styrene, 3,5-diethylstyrene, 4-propylstyrene, 2,4,6-trimethyl-styrene, 4-dodecylstyrene, 3-methyl-5-n-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-iso-propyl-1-vinylnaphthalene, 6-cyclohexyl-1-vinylnaphthalene, 7-dodecyl-2-vinylnaphthalene, α-methylstyrene, and the like. Preferably, the vinyl aromatic monomer is selected from styrene, 3-methylstyrene and α-methylstyrene, in particular the vinyl aromatic monomer is styrene.

Elastomeric Copolymers

Some representative examples of elastomeric copolymers that can be functionalized by using the styrene derivatives of this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. In cases where the elastomeric copolymer is comprised of repeat units that are derived from two or more monomers, the repeat units which are derived from the different monomers, including the styrene derivative, will normally be distributed in an essentially random manner. The repeat units that are derived from the monomers differ from the monomer in that a double bond is normally consumed in by the polymerization reaction.

The elastomeric copolymer can be made by solution polymerization in a batch process or in a continuous process by continuously charging at least one conjugated diolefin monomer, the styrene derivative, and any optional additional monomers into a polymerization zone. The polymerization zone will typically be a polymerization reactor or a series of polymerization reactors. The polymerization zone will normally provide agitation to keep the monomers, polymer, initiator, and modifier well dispersed throughout the organic solvent in the polymerization zone. Such continuous polymerizations are typically conducted in a multiple-reactor system. The elastomeric copolymer as synthesized is continuously withdrawn from the polymerization zone. Incremental addition, or a chain transfer agent, such as 1,2-butadiene, may be used in order to avoid excessive gel formation. The monomer conversion attained in the polymerization zone will normally be at least about 85%. It is preferred for the monomer conversion to be at least about 90%.

Anionic Initiator

The polymerization will typically be initiated with an anionic initiator, such as organic lithium compound, a lithium amide compound, or a functionalized initiator-containing nitrogen atom. As the organic lithium compound, there are preferred those having a hydrocarbon group having 1 to 20 carbon atoms. There can be mentioned, for example, methyl lithium, ethyl lithium, n-propyl lithium, isopropyl lithium, n-butyl lithium, sec-butyl lithium, tert-octyl lithium, n-decyl lithium, phenyllithium, 2-naphthyl lithium, 2-butylphenyl lithium, 4-phenylbutyl lithium, cyclohexyl lithium, cyclopentyl lithium, and a reaction product of diisopropenylbenzene with butyl lithium. Of these compounds, n-butyl lithium and sec-butyl lithium are preferred.

As the lithium amide compound, there can be mentioned, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methyl-piperadide, lithium ethylpropylamide, lithium ethylbutylamide, lithium ethylbenzylamide and lithium methylphenethylamide. Of these compounds, preferred from the standpoint of the polymerization initiation ability are cyclic lithium amides such as lithium hexamethyleneimide, lithium pyrrolidide, lithium piperidide, lithium heptamethyleneimide and lithium dodecamethyleneimide; and particularly preferred are lithium hexamethyleneimide, lithium pyrrolidide and lithium piperidide.

The lithium amide compound, if present, is, in general, prepared beforehand from a secondary amine and a lithium compound and then used in polymerization; however, it may be prepared in the polymerization system (in situ). The amount of the lithium initiator utilized will vary with the monomers being polymerized and with the molecular weight that is desired for the polymer being synthesized.

Functionalized initiator is preferably prepared by the reaction of an organometallic compound, namely a salt of an alkali metal, such as n-butyl lithium, with a functional styrene monomer represented by formula (I), which reaction leads to functional initiator represented by formula (II):

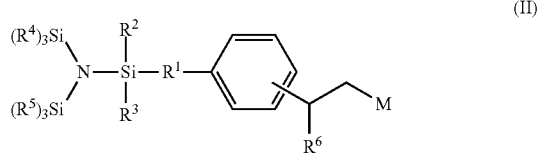

wherein $R^1$ is selected from the group consisting of:
a) a single bond;
b) —$(CH_2)_n$—, wherein n represents an integer from 1 to 12;
c) —$(CH_2CH_2Y)_n$—, wherein n represents an integer from 1 to 12, and Y can independently be oxygen or sulfur;
d) —$CH_2$—$(CH_2CH_2Y)_n$—$CH_2$—, wherein n represents an integer from 1 to 12, and Y can independently be oxygen or sulfur;
e) —$(CH_2CH_2NR)_n$—, wherein n represents an integer from 1 to 12, and R can independently represent an alkyl group containing from 1 to 10 carbon atoms, or an aryl or aralkyl group containing from 6 to 10 carbon atoms;
f) —$CH_2$—$(CH_2CH_2NR)_n$—$CH_2$—, wherein n represents an integer from 1 to 12, and R can independently represent an alkyl group containing from 1 to 10 carbon atoms, or an aryl or aralkyl group containing from 6 to 10 carbon atoms;

$R^2$, $R^3$ can be the same or different and represent an alkyl group containing from 1 to 10 carbon atoms, or an aryl or aralkyl group containing from 6 to 10 carbon atoms;

$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms;

M is an alkali metal selected from lithium, sodium, and potassium, and is preferably lithium; and $R^6$ represents an alkyl group containing from 1 to 18 carbon atoms, or an aryl or aralkyl group containing from 6 to 18 carbon atoms.

The alkali metal salt derivative is typically prepared by reaction of one or more organometallic compounds with one or more styrene derivatives having general formula (I). The time of reaction between organometallic compound and styrene derivative of formula (I) is preferably from 1 to 60 min, more preferably from 1 to 20 min and most preferably from 1 to 10 min.

The organometallic compound as used in the preparation of the polymerization initiator from the styrene derivative of formula (I) is thus an organometallic lithium compound, organic sodium compound, or organic potassium compound:

As the organometallic lithium compound, there are preferred those having a hydrocarbon group having 1 to 20 carbon atoms; for example, methyllithium, ethyllithium, n-propyllithium, isopropyllithium, n-butyllithium, sec-butyllithium, tert-butyllithium, tert-octyllithium, n-decyllithium, phenyl-lithium, 2-naphthyllithium, 2-butylphenyllithium, 4-phenyl-butyllithium, cyclohexyllithium and cyclopentyllithium; of these compounds, n-butyllithium and sec-butyllithium are preferred.

As the organometallic sodium compound, there are preferred those having a hydrocarbon group having 1 to 20 carbon atoms; for example, methylsodium, ethylsodium, n-propylsodium, isopropylsodium, n-butylsodium, sec-butylsodium, tert-butyl-sodium, tert-octylsodium, n-decylsodium, phenylsodium, 2-naphthylsodium, 2-butylphenylsodium, 4-phenylbutylsodium, cyclohexylsodium and cyclopentylsodium; of these compounds, n-butylsodium and sec-butylsodium are preferred.

As the organometallic potassium compound, there are preferred those having a hydrocarbon group having 1 to 20 carbon atoms; for example, methylpotassium, ethylpotassium, n-propyl-potassium, isopropylpotassium, n-butylpotassium, sec-butyl-potassium, tert-butylpotassium, tert-octylpotassium, n-decyl-potassium, phenylpotassium, 2-naphthylpotassium, 2-butyl-phenylpotassium, 4-phenylbutylpotassium, cyclohexylpotassium and cyclopentylpotassium; of these compounds, n-butylpotassium and sec-butylpotassium are preferred.

The mole ratio of organometallic compound (preferably organic lithium compound) to styrene derivative of formula (I) is preferably from 0.5:1 to 1:1. It is typically preferred to incorporate 0.05% to 1% (by weight of monomers) of the functionalized initiator of formula (II) into the elastomeric copolymer.

One of the greatest advantages of the styrene derivative of general formula (I) is that there is no need for omega-chain end functionalization, with additional compounds, to provide chemical interaction of rubber with the silica filler (even though additional omega-chain end functionalization is not excluded). Furthermore the best dynamic properties of rubber compound obtained with use of rubber functionalized with styrene derivative of formula (I) are achieved when this monomer is also used as functional pre-initiator. Thus, in a preferred embodiment, the styrene derivative of formula (I) is used both 1) as comonomer and 2) as alkali metal salt derivative of the styrene derivative of formula (I), as initiator for the copolymerization.

In a third aspect, the invention relates to an elastomeric copolymer comprising repeat units that are derived from
A) 20 wt. % to 99.95 wt. %, by weight of the copolymer, of one or more diene monomers;
B) 0 wt. % to 60 wt. %, by weight of the copolymer, of one or more vinyl aromatic monomers; and
C) 0.05 wt. % to 50 wt. %, by weight of the copolymer, of one or more styrene derivatives of formula (I).

Preferably, the diene monomer is a conjugated diene. More preferably, the conjugated diene monomer is selected from 1,3-butadiene, isoprene, 1,3-pentadiene, 2,3-dimethyl-1,3-buta-diene, 2-methyl-1,3-pentadiene, 2,3-dimethyl-1,3-pentadiene, 2-phenyl-1,3-butadiene, and 4,5-diethyl-1,3-octadiene. Most preferably the conjugated diene monomer is selected from 1,3-butadiene and isoprene, and in particular the conjugated diene monomer is 1,3-butadiene.

Typically, the amount of A) conjugated diene monomer(s) is 40 to 90 wt. %, by weight of the copolymer, preferably 50 to 90 wt. %, by weight of the copolymer, in particular 60 to 90 wt. %, by weight of the copolymer.

Preferably, the vinyl aromatic monomer in the elastomeric copolymer is selected from styrene, 1-vinylnaphthalene, 3-methylstyrene, 3,5-diethylstyrene, 4-propylstyrene, 2,4,6-tri-methylstyrene, 4-dodecylstyrene, 3-methyl-5-n-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-iso-propyl-1-vinylnaphthalene, 6-cyclohexyl-1-vinylnaphthalene, 7-dodecyl-2-vinylnaphthalene, and α-methylstyrene. Vinylbenzyl-amines of are also suitable vinyl aromatic monomers.

More preferably, the vinyl aromatic monomer is selected from styrene, 3-methylstyrene and α-methylstyrene, and in particular the vinyl aromatic monomer is styrene. Most preferably, component B) is styrene.

Typically, the amount of B) vinyl aromatic monomer(s) in the elastomeric copolymer is 10 to 60 wt. %, by weight of the copolymer, preferably 10 to 50 wt. %, by weight of the copolymer, in particular 20 to 50 wt. %, by weight of the copolymer.

Preferably, the elastomeric copolymer comprises the styrene derivative component C) in an amount of 0.05 to 50 wt. %, by weight of the copolymer, preferably 0.2 to 10 wt. %, by weight of the copolymer, in particular 0.5 to 2 wt. %, by weight of the copolymer.

Polar Modifiers

The polymerization process of this invention is normally conducted in the presence of polar modifiers, such as tertiary amines, alcoholates or alkyltetrahydrofurfuryl ethers. Some representative examples of specific polar modifiers that can be used include methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, 2,2-Bis(2-tetrahydrofuryl)propane, diethyl ether, di-n-propyl ether, diisopropyl ether, di-n-butyl ether, tetra-hydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethyl-ethylenediamine, N-methylmorpholine, N-ethylmorpholine, and N-phenylmorpholine.

A potassium or sodium compound may be added together with the polymerization initiator when it is intended to increase the reactivity of the polymerization initiator or when it is intended to arrange the aromatic vinyl compound at random in the polymer obtained or to allow the obtained polymer to contain the aromatic vinyl compound as a single chain. As the potassium or sodium added together with the polymerization initiator, there can be used, for example: alkoxides and phenoxides, typified by isopropoxide, tert-butoxide, tert-amyloxide, n-heptaoxide, menthoxide, benzyloxide and phenoxide; potassium or sodium salts of organic sulfonic acids, such as dodecylbenzensulfonic acid, tetradecylbenzenesulfonic acid, hexadecylbenzenesulfonic acid, octadecylbenzenesulfonic acid and the like.

The polar modifier will typically be employed at a level wherein the molar ratio of the polar modifier to the lithium initiator is within the range of about 0.01:1 to about 5:1. The potassium or sodium compound is preferably added in an amount of 0.005 to 0.5 mol per mol equivalent of the alkali metal of the polymerization initiator. When the amount is less than 0.005 mol equivalent, the addition effect of the potassium compound (the increase in the reactivity of polymerization initiator and the randomization or single chain addition of aromatic vinyl compound) may not appear. Meanwhile, when the amount is more than 0.5 mol equivalent, there may be a reduction in polymerization activity and a striking reduction in productivity and, moreover, there may be a reduction in the modification efficiency in the primary modification reaction.

Preferably, the elastomeric copolymer of the invention comprises units having a star structure that are produced by the reaction of metal-terminated living linear copolymer with one or more coupling agents.

The coupling agent may be a tin halide coupling agent. Preferably, the tin halide coupling agent is tin tetrachloride.

Alternatively, the coupling agent is a silicon halide coupling agent. Preferably, the silicon halide coupling agent is selected from silicon tetrachloride, silicon tetrabromide, silicon tetrafluoride, silicon tetraiodide, hexachlorodisilane, hexabromodisilane, hexafluorodisilane, hexaiododisilane, octachlorotrisilane, octabromotrisilane, octafluorotrisilane, octaiodotrisilane, hexachlorodisiloxane, 2,2,4,4,6,6-hexachloro-2,4,6-trisilaheptane, 1,2,3,4,5,6-hexakis[2-(methyldi-chlorosilyl)ethyl]benzene, and alkyl silicon halides of general formula (III)

$$R^9{}_n\text{—Si—}X_{4-n} \quad (III),$$

wherein $R^9$ is a monovalent aliphatic hydrocarbon group having 1 to 20 carbon atoms or a monovalent aromatic hydrocarbon group having 6 to 18 carbon atoms; n is an integer of 0 to 2; and X can be a chlorine, bromine, fluorine or iodine atom.

Preferably, the fraction of units having star structure in the elastomeric copolymer is between 15 and 75%, by weight of the copolymer.

Coupling Agent

The polymerization is normally carried out until high conversions of at least about 90% are attained. The polymerization is then typically terminated by the addition of a coupling agent. For example, a tin halide and/or silicon halide can be used as a coupling agent. The tin halide and/or the silicon halide are continuously added in cases where asymmetrical coupling is desired. The coupling agents can, in a hydrocarbon solution, be added to the polymerization admixture with suitable mixing for distribution and reaction.

It should be noted that, according to the present invention, the fraction of (co)polymer chains being coupled can vary between 15 to 75%, which is achieved by controlled addition of coupling agent, in the amount required to bond the desired portion of the (co)polymer chains. The exact amount of coupling agent is calculated based on its theoretical functionality and required coupling fraction.

A fourth aspect of the invention is a method for preparing a rubber comprising vulcanizing the elastomeric copolymer according to the third aspect in the presence of one or more vulcanizing agents.

A fifth aspect of the invention is a rubber as obtainable according to the method of the fourth aspect.

A sixth aspect of the invention is a rubber composition comprising x) a rubber component comprising the rubber according to the fifth aspect. Preferably, the rubber component x) also comprises one or more further rubbery polymers. Further rubbery polymers are preferably selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

Also preferably, the rubber composition further comprising y) one or more fillers. Preferably, the filler is selected from the group consisting of silica and carbon black. More preferably, the rubber composition comprises y) both silica and carbon black.

Typically, the rubber composition comprises an amount of filler component y) of 10 to 150 parts by mass relative to 100 parts by mass of the rubber component x) (phr), preferably the amount of component y) is 20 to 140 phr, more preferably the amount of component y) is 50 to 130 phr.

According to the seventh aspect, the invention relates to a tire component comprising the rubber composition of the sixth aspect. Preferably, the tire component is a tire tread.

According to the eighth aspect, the invention relates to a tire comprising the tire component of the seventh aspect.

Description of Polymer Preparation

The preparation of the polymer system of the present invention typically and preferably comprises the following steps:

Step 1—Polymer Synthesis

Polymer is prepared by forming a solution of one or more anionically polymerizable monomers in a solvent and initiating the polymerization of the monomers with the alkyl lithium initiator.

Copolymers preferably comprise
from 99.8 to 30 percent by weight of diene-derived units,
from 0 to 60 percent by weight of monovinyl aromatic hydrocarbon-derived units, and
0.5 to 2% percent by weight of units derived from the styrene derivative of the present invention.

Copolymers described according to the present invention typically have a 1,2-microstructure content in a range of from 5% to 100%, preferably of from 10% to 90% and most preferably of from 20% to 80%, based upon the diene content.

To obtain a random structure of copolymer and/or to increase the vinyl structure content, especially when styrene and butadiene monomers are used, a modifier may optionally be added to the polymerization with the usage between 0 to 90 or more mol equivalents per equivalent of lithium. The specific amount depends upon the type of modifier and the amount of vinyl desired, the level of styrene employed, and the temperature of the polymerization.

To start the polymerization, solvent and all monomers are charged to the reactor, which is followed by addition of modifier. After stabilization of the temperature range, initiator should be added. The reaction mixture should be agitated. The reaction should be carried out under anhydrous, anaerobic conditions. The reaction can be carried out for about 0.1 to 24 hours, depending on the temperature, molecular weight of desired product, and modifier used. Resulting (co)polymer is further subjected to steps 2 and 3, as set out below.

Step 2—Coupling

Coupling is typically done by addition of a selected coupling agent to the (co)polymer system resulting from Step 1, at conditions similar or close to the polymerization conditions described earlier.

It should be noted that, according to the present invention, the fraction of (co)polymer chains being coupled will typically vary from 15 to 75%, which is achieved by controlled addition of coupling agent, in the amount required to bond the desired portion of the (co)polymer chains. The exact amount of coupling agent is calculated based on its theoretical functionality and required coupling fraction.

Functionality of coupling compound should be understood as the theoretical number of living chain ends which may undergo a reaction with coupling agent.

After addition of coupling agent, antioxidants, and/or alcohols for stopping polymerization reaction, may be added if necessary.

The present invention is described specifically below by way of examples. However, the present invention is in no way restricted to these examples.

EXAMPLES

In order to provide more details about the synthesis and properties of elastomers prepared according to the present invention, functionalized styrene-butadiene copolymers with exactly controlled micro- and macrostructure and with functional groups of various types are described in Examples 2 to 4 below, and are compared with a non-functionalized copolymer as described in Comparative Example 1. "Parts per hundred rubber", "phr", and "%" are based on mass unless otherwise specified. The measurement methods and evaluation methods of properties are shown below.

Polymerization

Inertization Step:

Cyclohexane (1,200 g) was added to a nitrogen-purged two liter reactor and treated with 1 gram of 1.6 M n-butyl lithium solution in cyclohexane. The solution was heated to 70° C. and vigorously stirred for 10 minutes to perform cleaning and inertization of the reactor. After that, solvent was removed via a drain valve and nitrogen was purged again.

Example 1

Comparative

Cyclohexane (820 g) was added to the inerted two liter reactor, followed by addition of styrene (31 g) and of 1,3-butadiene (117 g). Inhibitor from styrene and 1,3-butadiene was removed. Next, tetramethylethylenediamine (TMEDA, 2.21 mmol) was added, to provide random incorporation of styrene monomer and to increase the vinyl content of the butadiene units. The solution inside the reactor was heated to 60° C. and continuously stirred during the whole process. When the desired temperature was reached, n-butyl lithium (0.045 mmol) was added to perform quenching of residual impurities. Then, n-butyl lithium (0.845 mmol) was added to initiate the polymerization process. The reaction was carried out as an isothermic process for 60 minutes. After this time, silicon tetrachloride ($5.25 \times 10^{-5}$ mol) was added to the polymer solution as a coupling agent. Coupling was performed for 5 minutes. The reaction solution was terminated using nitrogen-purged isopropyl alcohol (1 mmol) and rapidly stabilized by addition of 2-methyl-4,6-bis(octylsulfanylmethyl)phenol (at 1.0 phr polymer). The polymer solution was treated with iso-propanol, and precipitation of polymer occurred. The final product was dried overnight in a vacuum oven.

Example 2

Styrene Derivate as Comonomer

Cyclohexane (820 g) was added to the inerted two liter reactor, followed by addition of styrene (31 g), N-(dimethyl (vinylbenzyl)silyl)-N,N-bis(trimethylsilyl)amine 50/50 by weight mixture of isomers of formula (4) and (5) (0.6 g) and 1,3-butadiene (117 g). Inhibitor from styrene and 1,3-butadiene was removed. Next, 2,2-Bis(2-tetrahydrofuryl)-propane (DTHFP, 2.52 mmol) was added, to provide random incorporation of styrene monomer and to increase the vinyl content of the butadiene units. The solution inside the reactor was heated to 60° C. and continuously stirred during the whole process. When the desired temperature was reached, n-butyl lithium (0.045 mmol) was added to perform quenching of residual impurities. Then, n-butyl lithium (0.84 mmol) was added to initiate the polymerization process. The reaction was carried out as a isothermic process for 60 minutes. After this time, silicon tetrachloride ($6.30 \times 10^{-5}$ mol) was added to the polymer solution as a coupling agent.

Coupling was performed for 5 minutes. The reaction solution was terminated using of nitrogen-purged isopropyl alcohol (1 mmol) and rapidly stabilized by addition of 2-methyl-4,6-bis(octylsulfanylmethyl)-phenol (at 1.0 phr polymer). The polymer solution was treated with isopropanol, and precipitation of polymer occurred. The final product was dried overnight in a vacuum oven.

Example 3

Styrene Derivates as Both Initiator Component and as Comonomer

Cyclohexane (820 g) was added to the inerted two liter reactor, followed by addition of styrene (31 g), N-(dimethyl(vinylbenzyl)silyl)-N,N-bis(trimethylsilyl)amine 50/50 by weight mixture of isomers of formula (4) and (5) (0.6 g) and 1,3-butadiene (117 g). Inhibitor from styrene and 1,3-butadiene was removed. Next, 2,2-Bis(2-tetrahydrofuryl)-propane (DTHFP, 3.69 mmol) was added as a styrene randomizer and to increase the vinyl content of the butadiene monomer-contributed units. The solution inside the reactor was heated to 60° C. and continuously stirred during the whole process. When the temperature was reached, n-butyl lithium (0.045 mmol) was added to the reactor, to perform quenching of residual impurities.

n-BuLi (1.23 mmol) and N-(dimethyl(vinylbenzyl)silyl)-N,N-bis(trimethylsilyl)amine 50/50 by weight mixture of isomers of formula (4) and (5) (0.4 g) were mixed together in a burette, the contact time was about 15 min, and then the mixture was added to initiate the polymerization process. The reaction was carried out over 60 minutes, as an isothermic process. After this time, silicon tetrachloride (6.30×10$^{-5}$ mol) was added to the polymer solution as a coupling agent. Coupling was performed for 5 minutes. The reaction solution was terminated using nitrogen-purged isopropyl alcohol (1 mmol) and rapidly stabilized by addition of 2-methyl-4,6-bis(octylsulfanyl-methyl)phenol (at 1.0 phr polymer). The polymer solution was treated with isopropanol, and precipitation of polymer occurred. The final product was dried overnight in a vacuum oven.

Example 4

Continuous Polymerization

The butadiene-styrene copolymer was prepared in a continuous reactor chain of three reactors having a volume of 10 L (reactor 1), 20 L (reactor 20) and 10 L (reactor 3), respectively, where each reactor was equipped with a paddle stirrer. The agitation speed was 150-200 rpm and filling factor at the level of 50%-60%. Hexane, styrene, 1,3-butadiene, 1,2-butadiene (gel formation prevention additive), DTHFP and N-(dimethyl(vinylbenzyl)silyl)-N,N-bis(trimethylsilyl)amine 50/50 by weight mixture of isomers of formula (4) and (5) (the last three reactants as a solutions in hexane) were dosed into the first reactor, with flow rates of 10752.00 g/h, 398.00 g/h, 1499.00 g/h, 19.00 g/h, 102 g/h and 48.00 g/h, respectively. n-Butyl lithium flow rate (n-BuLi, as a solution in hexane) was 107.00 g/h, and N-(dimethyl(vinylbenzyl)silyl)-N,N-bis(trimethylsilyl) amine (as a solution in hexane) flow rate was 105.00 g/h. Streams of n-BuLi and 50/50 by weight mixture of isomers of silanamine of formula (4) and (5) were mixed together in the pipe, before entering the reactor, and the contact time was about 15 min. The temperature in the reactors was between 70° C. to 85° C. To obtain branched rubber silicon tetrachloride was added at the reactor 3 inlet, at the entry of static mixer, in a SiCl$_4$/active n-BuLi ratio 0.05. The coupling reaction was performed at 70-85° C. At the reactor 3 outlet, 2-methyl-4,6-bis(octylsulfanylmethyl)phenol (as a solution in hexane) was added as an antioxidant (142 g/h). The polymers were recovered by a conventional recovery operation using steam stripping of the solvent, were dried in a screwtype dewatering system at 70° C., and then dried for 40 minutes in the dryer.

Characterization
Vinyl Content (%)
Determined by 600 MHz $^1$H-NMR, based on BS ISO 21561:2005
Bound Styrene Content (%)
Determined by 600 MHz $^1$H-NMR, based on BS ISO 21561:2005
Molecular Weight Determination
Gel permeation chromatography was performed via PSS Polymer Standards Service multiple columns (with guard column) using THF as the eluent and for sample preparation. Multi-angle laser light scattering measurements were carried out using a Wyatt Technologies Dawn Heleos II light scattering detector, DAD (PDA) Agilent 1260 Infinity UV-VIS detector and Agilent 1260 Infinity refractive index detector.
Glass transition temperature (° C.)
Determined based on PN-EN ISO 11357-1:2009
Mooney Viscosity (ML (1+4)/100° C.)
Determined based on ASTM D 1646-07, using an large rotor under the conditions of preheating=1 minute, rotor operating time=4 minutes, and temperature=100° C.
Vulcanization Characteristics
Determined based on ASTM D6204, using RPA 2000 Alpha Technologies rubber processing analyzer, operating time=30 minutes, and temperature=170° C.
Evaluation and Measurement of Properties of Rubber Composition
A vulcanized rubber compound was prepared using a polymer obtained in each of Examples, and was measured for the following test parameters
  i) Tire predictors (tan δ at 60° C., tan δ at 0° C., tan δ at −10° C.)
  A vulcanized rubber compound was used as a test sample and measured for this parameter, using a dynamic mechanical analyzer (DMA 450+ MetraviB) in single shear mode under the conditions of dynamic strain=2%, frequency=10 Hz, in the temperature range of from −70 to 70° C., with a heating rate of 2.5 K/min.
  ii) Rebound Resilience
  Determined based on ISO 4662
Table 1 shows the characterization results for the four samples synthesized for this study.

TABLE 1

| Example | $M_n$ [g/mol] | $M_w$ [g/mol] | $M_w/M_n$ | Vinyl content [%][1] | Styrene content [%] | Mooney | Tg [° C.] |
|---|---|---|---|---|---|---|---|
| 1 (comp.) | 223,000 | 323,000 | 1.44 | 61.90 | 20.45 | 60.4 | −26.8 |
| 2 | 225,000 | 319,500 | 1.42 | 61.82 | 20.90 | 55.4 | −24.3 |
| 3 | 226,000 | 329,900 | 1.46 | 62.70 | 21.36 | 60.2 | −25.1 |
| 4 | 184,000 | 260,900 | 1.76 | 62.53 | 21.58 | 52.1 | −23.5 |

[1]Based on 1,3-butadiene content

Compounding

Using the rubbers obtained in Examples 2, 3, 4 and Comparative Example 1, respectively, compounding was made according to the "compounding recipe of rubber composition" shown in Table 2. The compounding of the solution styrene-butadiene rubber, fillers, and rubber additives was performed in a Banbury type of internal mixer (350E Brabender GmbH & Co. KG) and on a lab sized two roll mill. The rubber compounds were mixed in two different stages and the final pass was completed on a two roll mill. The first stage was used to mix the polymer with oil, silica, silane coupling agent, 6PPD and activators in several steps. The second stage was to further improve the distribution of the silica along with adding of carbon black, then the compound was allowed to sit for 24 hours. In order to be conditioned for the final pass, the rubber compound was allowed to condition for four hours. The final mixing was performed on a two roll mill. The last step was used to add the cure packages. Then, each compound was vulcanized at 170° C., for $T_{95+1.5}$ minutes (based on RPA results), to obtain vulcanizates. Each vulcanized rubber compound was evaluated and measured for the above-mentioned curing characteristics, tire predictors and rebound resilience. The results are shown in Table 3.

TABLE 2

| Component | phr |
|---|---|
| SBR | 75 |
| Polybutadiene rubber[1] | 25 |
| Silica[2] | 80 |
| Carbon Black[3] | 10 |
| Stearic acid | 2 |
| Zinc oxide | 3 |
| Oil extender[4] | 37.5 |
| 6PPD[5] | 2 |
| Bis[3-(triethoxysilyl)propyl]tetrasulfide[6] | 6.4 |
| N-tert-butyl-2-benzothiazole sulfenamide[7] | 1.7 |
| 1,3-Diphenylguanidine[8] | 2 |
| Sulphur | 1.5 |

[1]Synteca 44, a product of Synthos
[2]Zeosil 1165MP, a product of Solvay
[3]ISAF-N234, a product of Cabot corporation
[4]VivaTec 500, a product of Klaus Dahleke KG
[5]VULKANOX 4020/LG, a product of Lanxess
[6]Si 69, a product of Evonik
[7]LUVOMAXX TBBS, a product of Lehmann & Voss & Co. KG
[8]DENAX, a product of Draslovka a.s.

TABLE 3

| Example | Rebound resilience (23° C.), [%] | Rebound resilience (70° C.), [%] | tan δ (60° C.) | tan δ, (0° C.) | tan δ, (−10° C.) |
|---|---|---|---|---|---|
| 1 (comp.) | 31.0 | 56.0 | 0.182 | 0.5082 | 0.6540 |
| 2 | 34.0 | 62.0 | 0.142 | 0.6455 | 0.7446 |
| 3 | 37.0 | 67.0 | 0.132 | 0.6567 | 0.7796 |
| 4 | 37.0 | 66.0 | 0.144 | 0.6690 | 0.9228 |

It is apparent from these results that in a silica mix, as judged based on the properties in the vulcanized state, SSBR 3 according to the invention imparts to the corresponding rubber composition 3 reinforcement properties which are superior to those obtained with the control SSBR 1 and with the other SSBR 2 according to the invention. Moreover, the data in Table 3 shows that SSBR 4 obtained in continuous polymerization has better reinforcement properties compared to control SSBR 1 and SSBR 2.

Furthermore, the tire predictors of rubber composition 3 according to the invention are improved relative to those of the control rubber composition 1 and of the rubber compositions 2 and 4 (in terms of rolling resistance) according to the invention. Moreover, said tire predictors are improved for rubber composition 2 according to the invention relative to the control rubber composition 1. Furthermore tire predictors are improved for rubber composition 4 according to the invention relative to the control rubber composition 1 additionally ice traction and dry traction properties are improved relative to those of the rubber composition 1, 2 and 3.

While certain representative embodiments and details have been shown for the purpose of illustrating the subject invention, it will be apparent to those skilled in this art that various changes and modifications can be made therein without departing from the scope of the subject invention, which scope is defined by the following claims.

The invention claimed is:

1. A method of producing an elastomeric copolymer, the method comprising copolymerizing one or more conjugated diene monomers with a styrene derivative of formula (I)

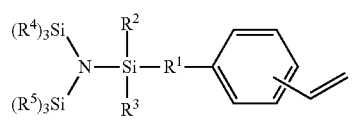

(I)

wherein $R^1$ is selected from the group consisting of:
a) a single bond;
b) —$(CH_2)_n$—, wherein n represents an integer from 1 to 12;
c) —$(CH_2CH_2Y)_n$—, wherein n represents an integer from 1 to 12, and Y can independently be oxygen or sulfur;
d) —$CH_2$—$(CH_2CH_2Y)_n$—$CH_2$—, wherein n represents an integer from 1 to 12, and Y can independently be oxygen or sulfur;
e) —$(CH_2CH_2NR)_n$—, wherein n represents an integer from 1 to 12, and R can independently represent an alkyl group containing from 1 to 10 carbon atoms, or an aryl or aralkyl group containing from 6 to 10 carbon atoms;
f) —$CH_2$—$(CH_2CH_2NR)_n$—$CH_2$—, wherein n represents an integer from 1 to 12, and R can independently represent an alkyl group containing from 1 to 10 carbon atoms, or an aryl or aralkyl group containing from 6 to 10 carbon atoms;
wherein $R^2$ and $R^3$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms.

2. The method of claim 1, wherein the method further comprises copolymerizing one or more vinyl aromatic monomers with the one or more diene monomers and styrene derivative of formula (I).

3. The method of claim 2, wherein the one or more diene monomers comprise conjugated monomers.

4. The method of claim 1, wherein an alkali metal salt derivative of the styrene derivative of formula (I) is used as an initiator for the copolymerization of i) one or more conjugated diene monomers and ii) one or more vinyl aromatic monomers,
   wherein the alkali metal is selected from lithium, sodium, potassium, and mixtures thereof.
5. The method of claim 1, wherein the styrene derivative of formula (I) is used as comonomer,
   wherein the styrene derivative of formula (I) is used as both x) comonomer and as y) alkali metal salt derivative of the styrene derivative of formula (I), as an initiator for the copolymerization.
6. A process for the preparation of a copolymer component comprising coupled copolymer and terminally modified copolymer, the process comprising the following steps:
   (1) providing an initiator component comprising one or more alkali metal salt derivatives of a styrene derivative of formula (I)

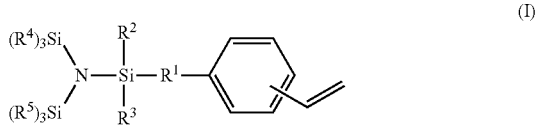

(I)

wherein $R^1$ is selected from the group consisting of:
      a) a single bond;
      b) $-(CH_2)_n-$, wherein n represents an integer from 1 to 12;
      c) $-(CH_2CH_2Y)_n-$, wherein n represents an integer from 1 to 12, and Y can independently be oxygen or sulfur;
      d) $-CH_2-(CH_2CH_2Y)_n-CH_2-$, wherein n represents an integer from 1 to 12, and Y can independently be oxygen or sulfur;
      e) $-(CH_2CH_2NR)_n-$, wherein n represents an integer from 1 to 12, and R can independently represent an alkyl group containing from 1 to 10 carbon atoms, or an aryl or aralkyl group containing from 6 to 10 carbon atoms;
      f) $-CH_2-(CH_2CH_2NR)_n-CH_2-$, wherein n represents an integer from 1 to 12, and R can independently represent an alkyl group containing from 1 to 10 carbon atoms, or an aryl or aralkyl group containing from 6 to 10 carbon atoms;
   wherein $R^2$ and $R^3$ can be the same or different and represent an alkyl group containing from 1 to 10 carbon atoms, or an aryl or aralkyl group containing from 6 to 10 carbon atoms; and
   $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms;
   (2) contacting a monomer component comprising
      iii) one or more conjugated diene monomers with the initiator component, to initiate anionic copolymerization;
   (3) continuing copolymerization, to result in a copolymer;
   (5) coupling a part of the copolymer of step (3) with one or more coupling agents, to result in coupled copolymer; and
   (6) terminally modifying a part of the copolymer of step (3) with one or more terminal modifying agents, to result in terminally modified copolymer.

7. The process of claim 6, wherein the monomer component further comprises one or more vinyl aromatic monomers.
8. The process of claim 6 further comprising (4) continuing copolymerization of the copolymer, in the presence of one or more functionalized monomers, to result in a functionalized copolymer.
9. The process of claim 8 further comprising:
   (5) coupling a part of the functionalized copolymer of step (4) with one or more coupling agents, to result in coupled copolymer; and
   (6) terminally modifying the functionalized copolymer of step (4) with one or more terminal modifying agents, to result in terminally modified copolymer.
10. The process of claim 6, wherein the monomer component in step (2) comprises one or more styrene derivatives of formula (I).
11. A process for producing an elastomeric copolymer comprising subjecting
   one or more diene monomers, and
   one or more styrene derivatives of formula (I)

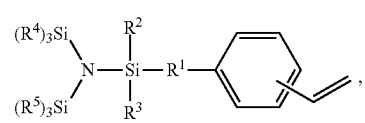

(I)

wherein $R^1$ is selected from the group consisting of:
      a) a single bond;
      b) $-(CH_2)_n-$, wherein n represents an integer from 1 to 12;
      c) $-(CH_2CH_2Y)_n-$, wherein n represents an integer from 1 to 12, and Y can independently be oxygen or sulfur;
      d) $-CH_2-(CH_2CH_2Y)_n-CH_2-$, wherein n represents an integer from 1 to 12, and Y can independently be oxygen or sulfur;
      e) $-(CH_2CH_2NR)_n-$, wherein n represents an integer from 1 to 12, and R can independently represent an alkyl group containing from 1 to 10 carbon atoms, or an aryl or aralkyl group containing from 6 to 10 carbon atoms;
      f) $-CH_2-(CH_2CH_2NR)_n-CH_2-$, wherein n represents an integer from 1 to 12, and R can independently represent an alkyl group containing from 1 to about 10 carbon atoms, or an aryl or aralkyl group containing from 6 to 10 carbon atoms;
   wherein $R^2$ and $R^3$ can be the same or different and represent an alkyl group containing from 1 to 10 carbon atoms, or an aryl or aralkyl group containing from 6 to 10 carbon atoms; and
   $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms,
   to anionic polymerization conditions.
12. The process of claim 11 further comprising subjecting one or more vinyl aromatic monomers to anionic polymerization conditions with the one or more diene monomers and the one or more styrene derivatives of formula (I).
13. An elastomeric copolymer comprising repeat units that are derived from
   A) 20 wt. % to 99.95 wt. %, by weight of the copolymer, of one or more diene monomers;

B) 0 wt. % to 60 wt. %, by weight of the copolymer, of one or more vinyl aromatic monomers; and C) 0.05 wt. % to 50 wt. %, by weight of the copolymer, of one or more styrene derivatives of formula (I)

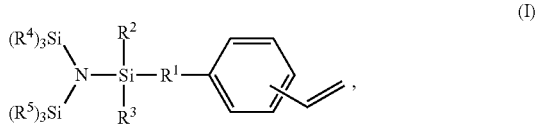

wherein $R^1$ is selected from the group consisting of:
a) a single bond;
b) —$(CH_2)_n$—, wherein n represents an integer from 1 to 12;
c) —$(CH_2CH_2Y)_n$—, wherein n represents an integer from 1 to 12, and Y can independently be oxygen or sulfur;
d) —$CH_2$—$(CH_2CH_2Y)_n$—$CH_2$—, wherein n represents an integer from 1 to 12, and Y can independently be oxygen or sulfur;
e) —$(CH_2CH_2NR)_n$—, wherein n represents an integer from 1 to 12, and R can independently represent an alkyl group containing from 1 to 10 carbon atoms, or an aryl or aralkyl group containing from 6 to 10 carbon atoms;
f) —$CH_2$—$(CH_2CH_2NR)_n$—$CH_2$—, wherein n represents an integer from 1 to 12, and R can independently represent an alkyl group containing from 1 to about 10 carbon atoms, or an aryl or aralkyl group containing from 6 to 10 carbon atoms;

wherein $R^2$ and $R^3$ can be the same or different and represent an alkyl group containing from 1 to 10 carbon atoms, or an aryl or aralkyl group containing from 6 to 10 carbon atoms; and $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms.

14. The elastomeric copolymer of claim 13 wherein the diene monomer comprises at least one conjugated diene monomer selected from the group consisting of 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, 4,5-diethyl-1,3-octadiene, and mixtures thereof.

15. The elastomeric copolymer of claim 14, wherein the amount of A) conjugated diene monomers is 40 to 90 wt. %, by weight of the copolymer.

16. The elastomeric copolymer of claim 14, wherein the amount of A) conjugated diene monomers is 60 to 90 wt. %, by weight of the copolymer.

17. The elastomeric copolymer of claim 13 wherein the vinyl aromatic monomer is selected from the group consisting of styrene, 1-vinylnaphthalene, 3-methylstyrene, 3,5-diethylstyrene, 4-propylstyrene, 2,4,6-trimethylstyrene, 4-dodecylstyrene, 3-methyl-5-n-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-isopropyl-1-vinylnaphthalene, 6-cyclohexyl-1-vinylnaphthalene, 7-dodecyl-2-vinylnaphthalene, α-methylstyrene, and mixtures thereof.

18. The elastomeric copolymer of claim 13 wherein the amount of B) vinyl aromatic monomers is 10 to 60 wt. %, by weight of the copolymer.

19. The elastomeric copolymer of claim 13 wherein $R^1$ of the styrene derivative of formula (I) is selected from (a) a single bond and (b) —$CH_2$.

20. The elastomeric copolymer of claim 13 wherein the amount of C) is 0.05 to 50 wt. %, by weight of the copolymer.

21. The elastomeric copolymer of claim 13 wherein the copolymer comprises units having a star structure and being produced by the reaction of metal-terminated living linear copolymer with one or more coupling agents.

22. The elastomeric copolymer of claim 21, wherein
I) the coupling agent is a tin halide coupling agent or
II) the coupling agent is a silicon halide coupling agent.

23. The elastomeric copolymer of claim 21, wherein the fraction of units having star structure is between 15 and 75%, by weight of the copolymer.

24. The elastomeric copolymer of claim 21 wherein the coupling agent is a tin halide coupling agent comprising tin tetrachloride.

25. The elastomeric copolymer of claim 21, wherein the coupling agent is a silicon halide coupling agent selected from silicon tetrachloride, silicon tetrabromide, silicon tetrafluoride, silicon tetraiodide, hexachlorodisilane, hexabromodisilane, hexafluorodisilane, hexaiododisilane, octachlorotrisilane, octabromotrisilane, octafluorotrisilane, octaiodotrisilane, hexachlorodisiloxane, 2,2,4,4,6,6-hexachloro-2,4,6-trisilaheptane-1,2,3,4,5,6-hexakis[2-(methyl-dichlorosilyl)ethyl]benzene, alkyl silicon halides of general formula (III)

wherein $R^6$ is a monovalent aliphatic hydrocarbon group having 1 to 20 carbon atoms or a monovalent aromatic hydrocarbon group having 6 to 18 carbon atoms; n is an integer of 0 to 2; and X can be a chlorine, bromine, fluorine or iodine atom, and mixtures thereof.

26. A method for preparing a rubber comprising vulcanizing the elastomeric copolymer according to claim 13 in the presence of one or more vulcanizing agents.

27. A rubber obtained according to the method of claim 26.

28. A rubber composition comprising x) a rubber component comprising the rubber according to claim 27.

29. The rubber composition according to claim 28, further comprising y) one or more fillers.

30. The rubber composition according to claim 29, wherein the amount of filler component y) is 10 to 150 parts by mass relative to 100 parts by mass of the rubber component x) (phr).

31. The rubber composition according to claim 29, wherein the amount of filler component y) is 30 to 130 parts by mass relative to 100 parts by mass of the rubber component x) (phr).

32. The rubber composition according to claim 28 wherein the rubber component x) also comprises one or more further rubbery polymers.

33. A tire component comprising the rubber composition of claim 32.

34. A tire comprising the tire component of claim 33.

35. A tire component comprising the rubber composition of claim 32 wherein the tire component is a tire tread.

36. The rubber composition according to claim 28, further comprising y) one or more fillers selected from the group consisting of silica, carbon black, and mixtures thereof.

37. The rubber composition according to claim 28 wherein the rubber component x) also comprises one or more further rubbery polymers selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber, and mixtures thereof.

38. The elastomeric copolymer of claim 13 wherein the diene monomer comprises 1,3-butadiene or isoprene.

39. The elastomeric copolymer of claim 13 wherein the diene monomer comprises 1,3-butadiene.

40. The elastomeric copolymer of claim 13 wherein the vinyl aromatic monomer comprises styrene, 3-methylstyrene, or α-methylstyrene.

41. The elastomeric copolymer of claim 13 wherein the vinyl aromatic monomer comprises styrene.

42. The elastomeric copolymer of claim 13 wherein the amount of B) vinyl aromatic monomers is 20 to 50 wt. %, by weight of the copolymer.

43. The elastomeric copolymer of claim 13 wherein the styrene derivative is selected from any one of formulae (1), (2), (3), (4), (5), and (6):

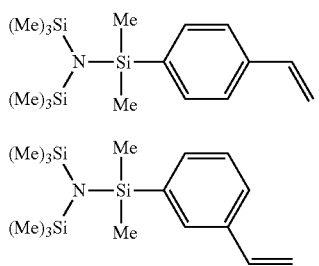

(1)

(2)

-continued

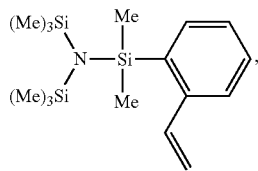

(3)

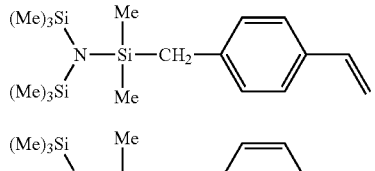

(4)

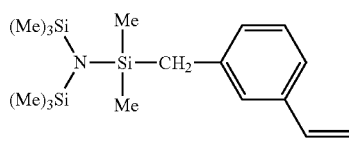

(5)

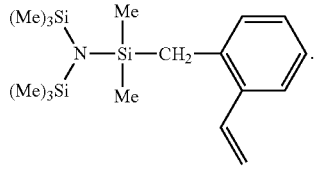

(6)

44. The elastomeric copolymer of claim 43 wherein the styrene derivative of formula (I) is selected from any one of formulae (1), (2), (4), and (5).

45. The elastomeric copolymer of claim 43 wherein the styrene derivative of formula (I) is selected from any one of formulae (1), (4), and (5).

46. The elastomeric copolymer of claim 13 wherein the amount of C) is 0.5 to 2 wt. %, by weight of the copolymer.

* * * * *